US011681103B2

(12) United States Patent
Sun et al.

(10) Patent No.: US 11,681,103 B2
(45) Date of Patent: Jun. 20, 2023

(54) ETCH VARIATION TOLERANT DIRECTIONAL COUPLERS

(71) Applicant: HEWLETT PACKARD ENTERPRISE DEVELOPMENT LP, Houston, TX (US)

(72) Inventors: Peng Sun, Palo Alto, CA (US); Mir Ashkan Seyedi, Palo Alto, CA (US); Thomas Van Vaerenbergh, Diegem (BE); Marco Fiorentino, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 154 days.

(21) Appl. No.: 16/883,969

(22) Filed: May 26, 2020

(65) Prior Publication Data

US 2021/0373241 A1    Dec. 2, 2021

(51) Int. Cl.
*G02B 6/293*     (2006.01)
*G02B 6/136*     (2006.01)
*G02B 6/12*      (2006.01)

(52) U.S. Cl.
CPC ......... *G02B 6/29338* (2013.01); *G02B 6/136* (2013.01); *G02B 6/12* (2013.01)

(58) Field of Classification Search
CPC ............... G02B 6/29338; G02B 6/136; G02B 2006/12088; G02B 2006/12097; G02B 2006/12147
See application file for complete search history.

(56) References Cited

U.S. PATENT DOCUMENTS

| 7,400,797 | B2 | 7/2008 | Bhagavatula et al. |
| 7,532,789 | B1* | 5/2009 | Doylend ............ G02B 6/12007 385/27 |
| 8,948,553 | B2 | 2/2015 | Taillaert et al. |
| 2005/0259923 | A1* | 11/2005 | Sriram .................. G02F 1/3132 385/50 |

(Continued)

FOREIGN PATENT DOCUMENTS

| CN | 214503948 | * 10/2021 | ............... G02B 6/13 |
| CN | 113777705 A | * 12/2021 | |

OTHER PUBLICATIONS

Shi et al , Ultracompact Directional Couplers Realized In InP By Utilizing Feature Size Dependent Etching, Optica Publishing Group, Optics Letters, vol. 33, Issue 17, pp. 1927-1929, https://opg.optica.org/ol/fulltext.cfm?uri=ol-33-17-1927&id=170908 (Year: 2008).*

(Continued)

*Primary Examiner* — Leslie C Pascal
(74) *Attorney, Agent, or Firm* — Sheppard Mullin Richter & Hampton LLP

(57) ABSTRACT

Embodiments of the present disclosure provide etch-variation tolerant optical coupling components and processes for making the same. An etch-variation tolerant geometry is determined for at least one waveguide of an optical coupling component (e.g., a directional coupler). The geometry is optimized such that each fabricated instance of an optical component design with the etch-variation tolerant geometry has substantially the same coupling ratio at any etch depth between a shallow etch depth and a deep etch depth.

18 Claims, 13 Drawing Sheets

(56) References Cited

U.S. PATENT DOCUMENTS

| | | | |
|---|---|---|---|
| 2007/0201784 A1* | 8/2007 | Kissa | E21B 11/005 385/8 |
| 2009/0034968 A1* | 2/2009 | Cherchi | G02B 6/12007 398/43 |
| 2010/0034223 A1* | 2/2010 | Osinski | H01S 5/026 977/773 |
| 2017/0003454 A1* | 1/2017 | Baets | G02B 6/3538 |
| 2021/0373241 A1* | 12/2021 | Sun | G02B 6/136 |

OTHER PUBLICATIONS

Prinzen et al, Fabrication Telerances of SOI Based Directional Couplers and Ring Resonators, Optica Publishing Group, Optics Express, vol. 21, Issue 14, pp. 17212-17220, https://opg.optica.org/oe/fulltext.cfm?uri=oe-21-14-17212&id=259080 (Year: 2013).*

Doerr et al., "Bending of a planar lightwave circuit 2/spl times/2 coupler to desensitize it to wavelength, polarization, and fabrication changes", IEEE Photonics Technology Letters, vol. 17(6), Jun. 2005, pp. 1211-1213.

Chen, G. F.R et al.; "Broadband Silicon-on-insulator Directional Couplers Using a Combination of Straight and Curved Waveguide Sections"; Scientific Reports; Aug. 3, 2017; 8 pg.

Mikkelsen, J.C. et al.; "Dimensional Variation Tolerant Silicon-on-insulator Directional Couplers"; Optics Express; Feb. 3, 2014; 6 pg; vol. 22; issue 3; OSA.

Prinzen, A. et al.; "Study on Fabrication Tolerances of SOI Based Directional Couplers and Ring Resonators"; Microelectronic Engineering; Jun. 1, 2014; pp. 51-54; issue 121; Elsevier B.V.

* cited by examiner

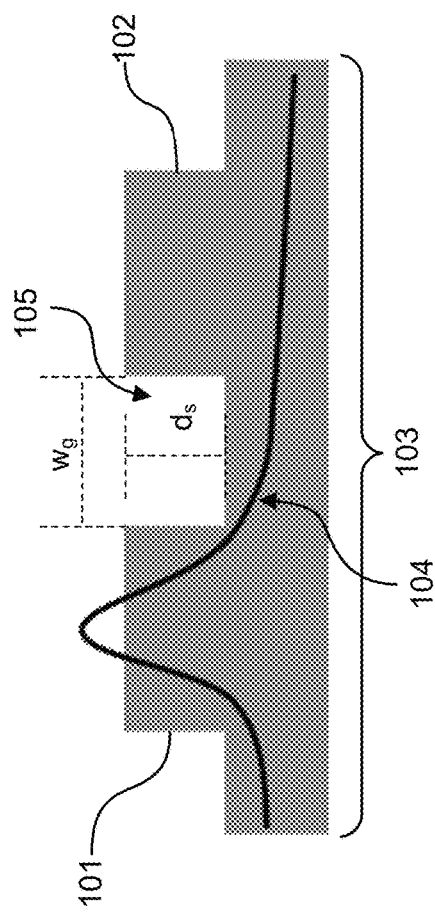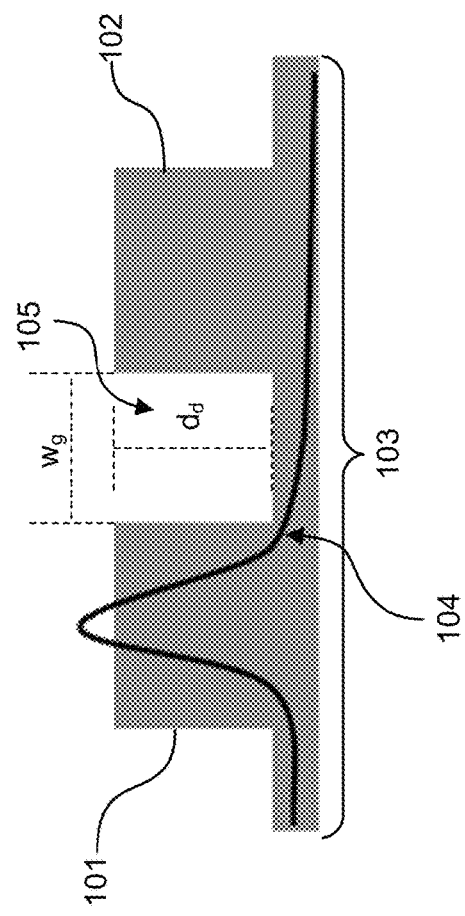

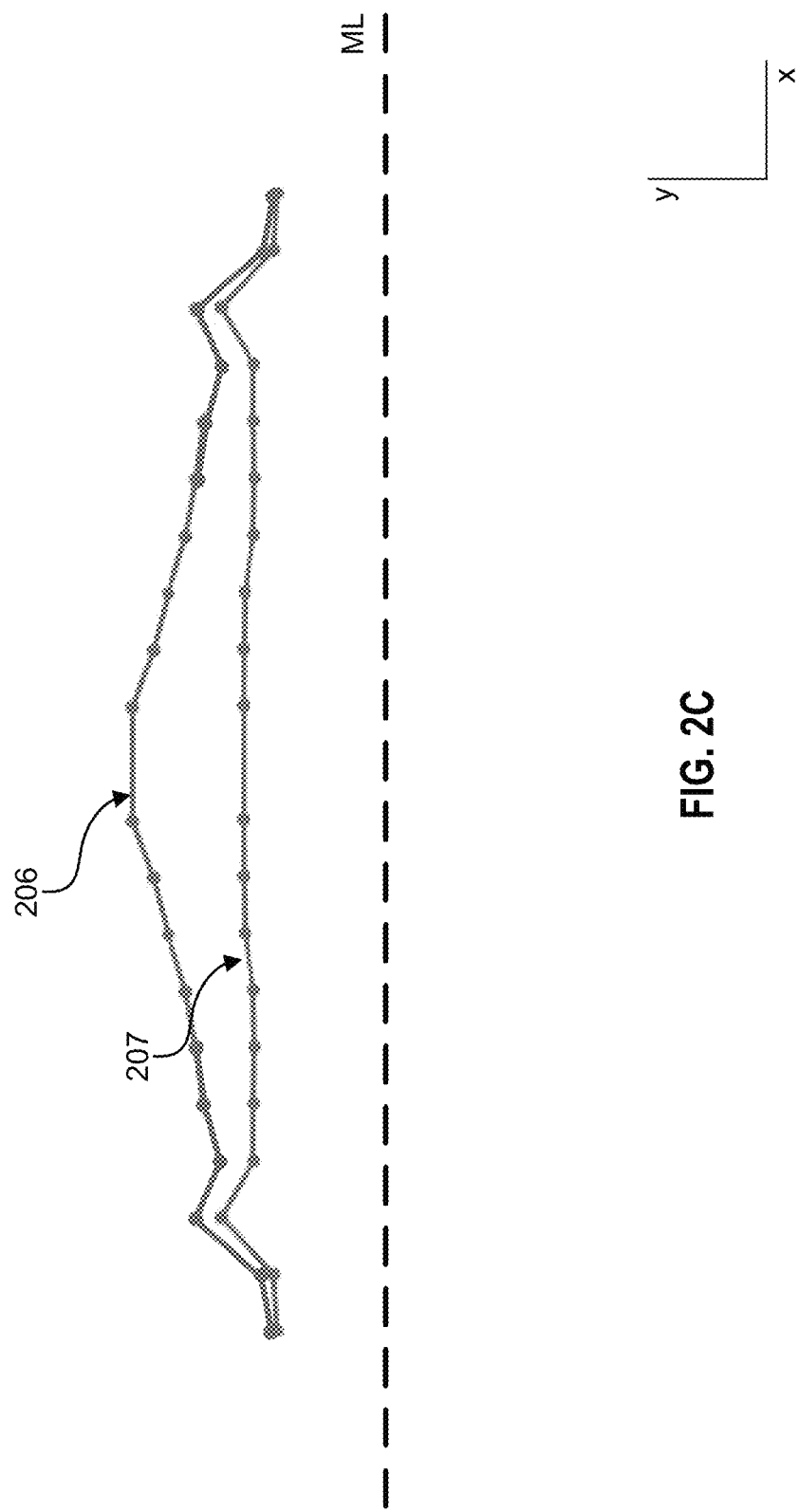

ETCH VARIATION TOLERANT DIRECTIONAL COUPLERS

DESCRIPTION OF RELATED ART

Directional couplers are used in optics to combine and split optical signals. At least two optical components (e.g., waveguides) are disposed in dose proximity to each other such that light can be exchanged between the two. A waveguide mode propagating through a first waveguide excites a corresponding mode within a neighboring waveguide, extending the mode into the neighboring waveguide. Directional couplers are fundamental budding blocks of many passive and active optical devices, including wavelength filters, modulators, and splitters.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A illustrates the effect of etch depth on a guided mode within a waveguide at a shallow etch depth in accordance with embodiments of the technology disclosed herein.

FIG. 1B illustrates the effect of etch depth on a guided mode within a waveguide at a deep etch depth in accordance with embodiments of the technology disclosed herein.

FIG. 2C illustrates an example asymmetrical shape of the example etch-variation tolerant geometry of FIGS. 2A and 2B.

Figure 2A:
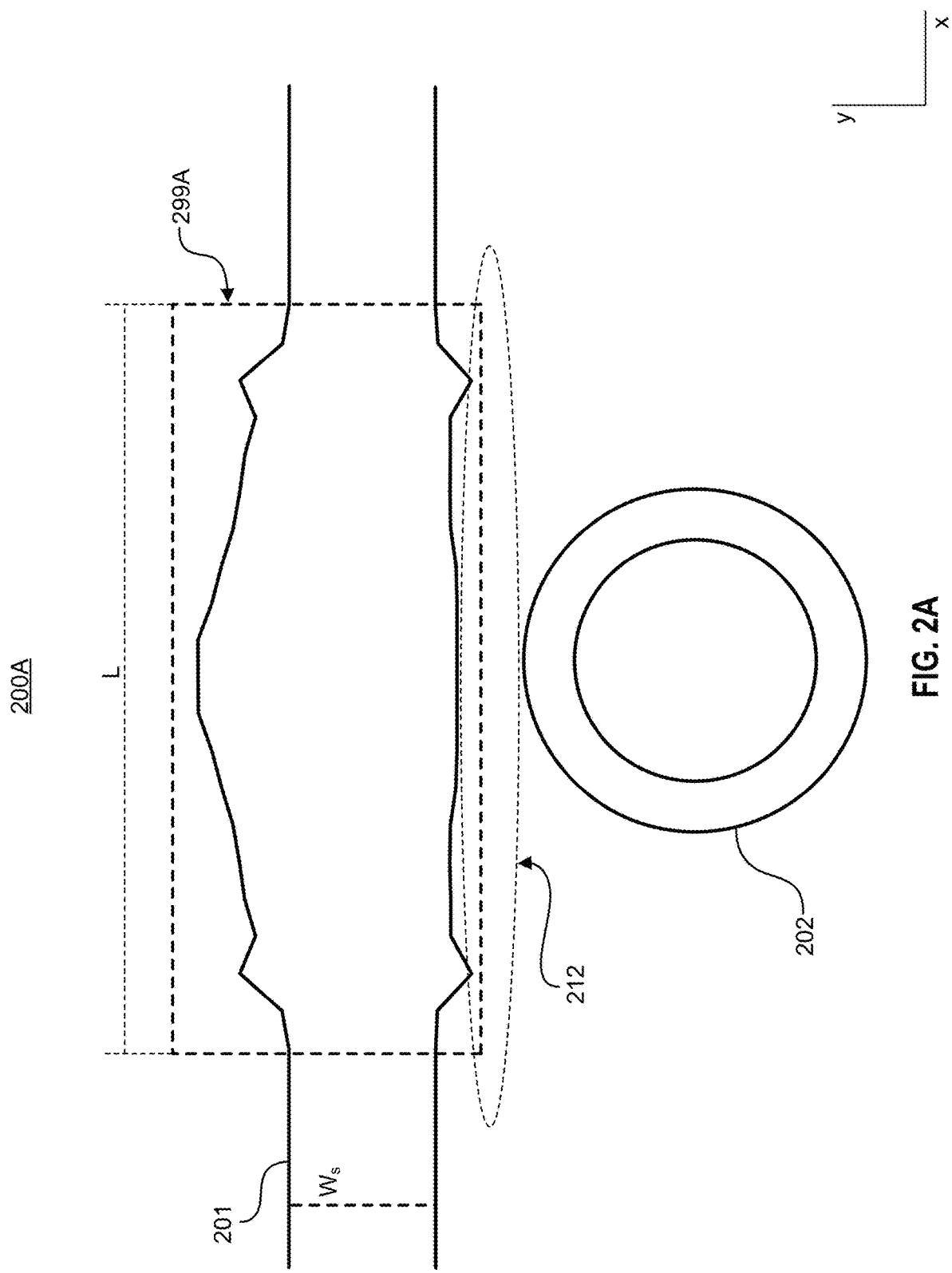
FIG. 2A illustrates an example directional coupler with an example etch-variation tolerant geometry in accordance with embodiments of the technology disclosed herein.

The figures are not exhaustive and do not limit the present disclosure to the precise form disclosed.

DETAILED DESCRIPTION

Photonic elements, such as waveguides and ring resonators, can be affected by several factors. Depth of the etch in the photonic device substrate is the most prominent factor affecting the coupling efficiency between photonic elements. FIGS. 1A and 1B illustrate the effect of etch depth on a guided mode within a respective waveguide. As shown in FIGS. 1A and 1B, a cross-section of a photonic device includes two waveguides (e.g., a first waveguide 101 and a second waveguide 102) referred to herein collectively as the waveguides 101, 102. The waveguides 101, 102 are etched out of a substrate 103. Evanescent coupling between the two waveguides 101, 102 occurs when the waveguides 101, 102 are close enough that the evanescent field of the guided mode passing through one waveguide (e.g., the waveguide 101) can excite the guided mode in the other waveguide (e.g., the waveguide 102).

During fabrication, variations may arise in the depth of the etched material between instances of the photonic element. The photonic element can be designed with an intended height for the waveguides 101, 102, based on the intended performance parameters, wherein the etch depth defines the heights of the waveguides 101, 102. Although designed with a specific height, the fabrication process can result in the etch depth for different fabricated instances of the photonic element to vary. This etch depth (and, accordingly, height of the waveguides) impacts the positioning or confinement of the guided mode within the respective waveguide. For example, when comparing the guided mode 104 of waveguide 101 at a shallower etch depth $d_s$ of FIG. 1A and at a deeper etch depth $d_d$, (e.g., etch depth $d_d$ is greater than etch depth $d_s$), it can be seen that the deeper etch depth $d_d$ results in greater confinement of the guided mode 104 within the respective waveguide 101. This greater confinement of the guided mode 104 within the respective waveguide 101 results in less coupling between the two waveguides 101, 102. On the nanometer scale of current photonic fabrication, this variation can reduce the coupling coefficient of an optical component (e.g., a ring resonator). Even a 1% change (positive or negative) in the coupling coefficient can result in inconsistent operation of similar devices of the same coupling component design.

A shallow etch depth corresponds to an etch depth that is less than the designed etch depth, and a deep etch depth corresponds to an etch depth that is greater than the designed etch depth. The maximum shallow etch depth (i.e., the shortest etch depth) and the maximum deep etch depth (i.e., the longest etch depth) can be determined with respect to the fabrication process and the designed etch depth. Moreover, the substrate (e.g., the wafer) on which the instances of the photonic element are fabricated may have variations in its depth, which can impact the etch depth achieved between the waveguides 101, 102 of the photonic element. Prior to fabrication, the wafer is usually examined to identify such inconsistencies in the substrate material. During the fabrication process, each fabricated instance may have an etch depth between the shallow etch depth $d_s$ and the deep etch depth $d_d$.

Embodiments of the present disclosure provides an etch-variation tolerant optical coupling component and a method of creating such a component. Although discussed with respect to directional couplers, the design method disclosed herein is applicable for use in designing any optical or opto-electrical component wherein coupling between at least two waveguide structures is required. As discussed herein, the etch-variation tolerant directional coupler comprises a first and second waveguide disposed on a substrate, having an etch gap between the waveguides. A coupling region between the two waveguides comprises a coupling portion of the first waveguide and a coupling portion of the second waveguide. The coupling portion of the second waveguide comprises an etch-variation tolerant waveguide geometry configured to control a transverse mode profile of a guided mode within the waveguide based on the etch depth of the etch gap along the length of the coupling region. In various embodiments, the etch-variation tolerant waveguide geometry may comprise a non-uniform shape along a length of the second waveguide and/or an asymmetrical shape across a midline of the second waveguide such that the distance of a first side of the coupling portion of the second waveguide extends a further distance from the midline than a second side of the coupling portion of the second waveguide. In various embodiments, a method of designing etch-variation tolerant optical coupling components is provided. In various embodiments, a guided mode of an optical coupling component having a first waveguide and a second waveguide is determined, as well as a range of etch depths of an etch gap along a length of the coupling region of the optical coupling component, ranging from a shallow etch depth to a deep etch depth. The range of etch depths may be determined based on the tolerances of the fabrication process utilized in various embodiments. An etch-variation tolerant shape is determined for the coupling portion of the second waveguide parallel to the coupling portion of the first waveguide across the etch gap. The etch-variation tolerant optical coupling component can be fabricated such that the coupling portion of the second waveguide comprises the etch-variation tolerant shape configured to control the transverse mode profile of the guided mode within the coupling region based on the etch depth. The geometry is configured such that weaker coupling at the deeper etch is counteracted by the stronger coupling at the shallow etch. In this way, the net coupling efficiency within the coupling region is more consistent regardless of fabrication variation between instances of the optical coupling component. Using the technology disclosed herein, an optical coupling component (e.g., a directional coupler) can be fabricated possessing greater tolerance to fabrication variation between each instance of the fabricated optical coupling component, thereby reducing variability in optical performance between devices having the same component design.

FIG. 2A illustrates an example directional coupler 200A having an example optimized etch-variation tolerant geometry 299A in accordance with respect to the technology disclosed herein. The example directional coupler and optimized etch-variation tolerant geometry 299A is provided for illustrative purposes only and should not be interpreted as limiting the scope of the technology to only the depicted embodiment. For ease of discussion, the example optimized etch-variation tolerant geometry 299A depicted is for a directional coupler 200A comprising a bus waveguide 201 and a ring waveguide 202. Although discussed with respect to optimization of such a directional coupler, the technology disclosed herein is applicable to any optical coupling component. In various embodiments, the bus waveguide 201 may comprise a standard width $W_s$. A portion of the bus waveguide 201 before and/or after the etch-variation tolerant geometry 299A can have the standard width $W_s$. In various embodiments, the shape may include one or more of tapers, bends, plateaus, spikes, periodic gratings, or other shapes possible to be fabricated into the waveguide. In various embodiments, the etch-variation tolerant geometry 299A comprises a coupling portion of the bus waveguide 201. A coupling region 212 exists between the etch-variation tolerant geometry 200A and the ring waveguide 202, wherein the two waveguides 201, 202 are disposed at a coupling distance. The coupling distance is dependent upon various optical properties of the material utilized to create the directional coupler and the particular design. Although the illustrated embodiment shows the coupling region extending the length L of the etch-variation tolerant geometry 299A, in other embodiments the coupling region may include only a portion of the etch-variation tolerant geometry 299A or include a portion of the bus waveguide 201 before and/or after the etch-variation tolerant geometry.

Figure 2B:
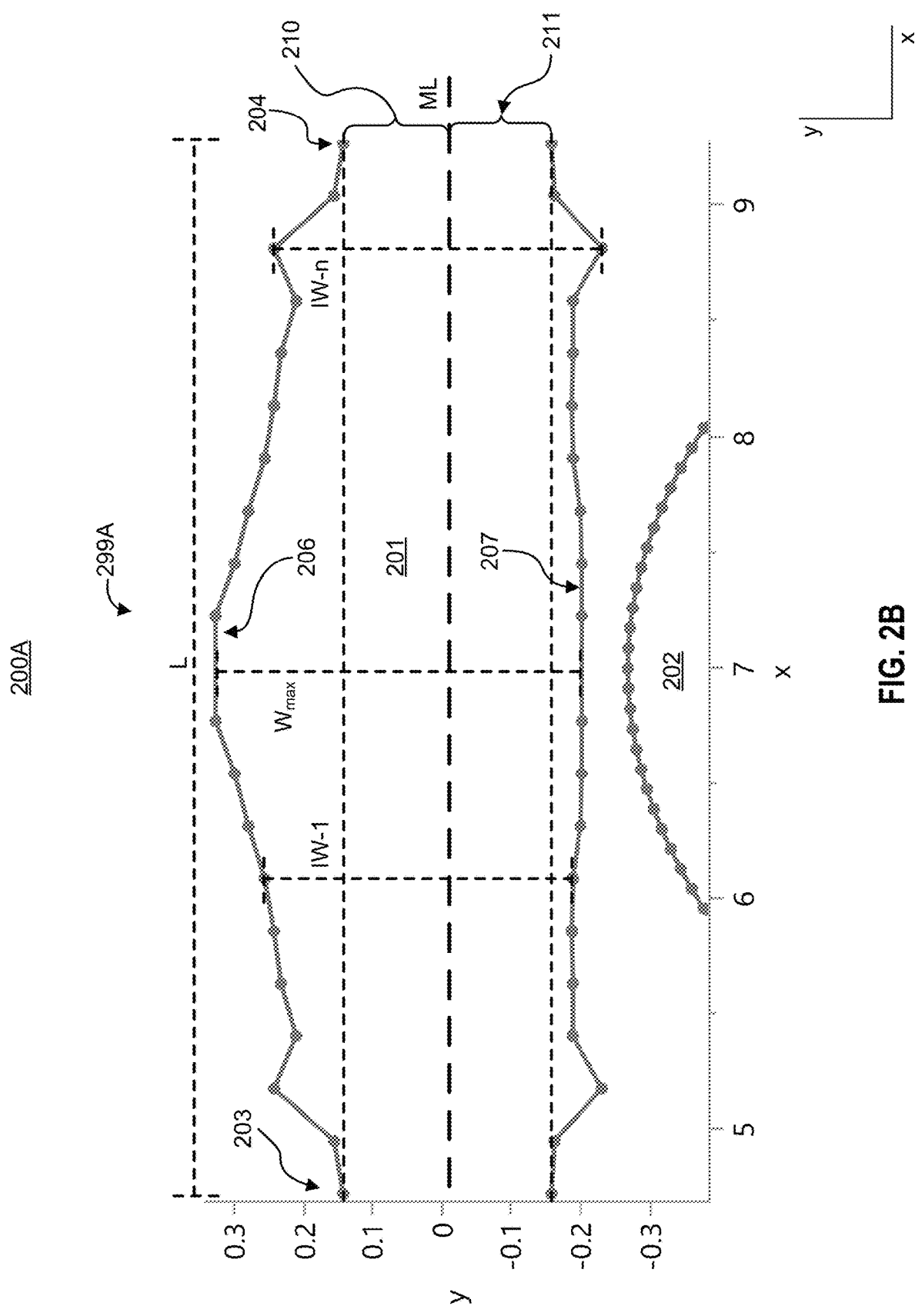
FIG. 2B illustrates the example etch-variation tolerant geometry of FIG. 2A.

As shown in more detail with respect to FIG. 2B, the ring waveguide 202 has a consistent shape, whereas the bus waveguide 201 has a non-uniform shape along the length of the bus waveguide 201 (i.e., along the x-axis). The units along the x-axis and the y-axis are not limiting with respect to the scope of the technology and are provided merely to provide context for ease of discussion. The etch-variation tolerant geometry 299A of the bus waveguide comprises a coupling length L from a first end 203 to a second end 204.

In various embodiments, the etch-variation tolerant geometry 299A can comprise a plurality of different widths across the length L of the bus waveguide 201. As a non-limiting example, the widths across the length L can range from the standard width $W_s$ of the bus waveguide 201 to maximum width $W_{max}$, with a plurality of intermediate widths IW-1 to IW-n (generally, "the intermediate width IW," collectively, "the intermediate widths IW") in between. The intermediate widths IW being greater than the standard width but less than the maximum width. In various embodiments, the etch-variation tolerant geometry may include a minimum width $W_{min}$ (not shown in FIG. 2B) that is smaller than the standard width $W_s$. The difference in widths W enables the etch-variation tolerant geometry 299A to compensate for potential variations in the etch depth between different fabrication runs of optical coupling components of the same design. Variations in etch depth can result in or cause changes in the coupling strength between the guided mode in the bus waveguide 201 and the ring waveguide 202. The etch-variation tolerant geometry compensates for fabrication variation in the etching process used to fabricate a plurality of optical coupling components of the same deign.

Figure 2D:
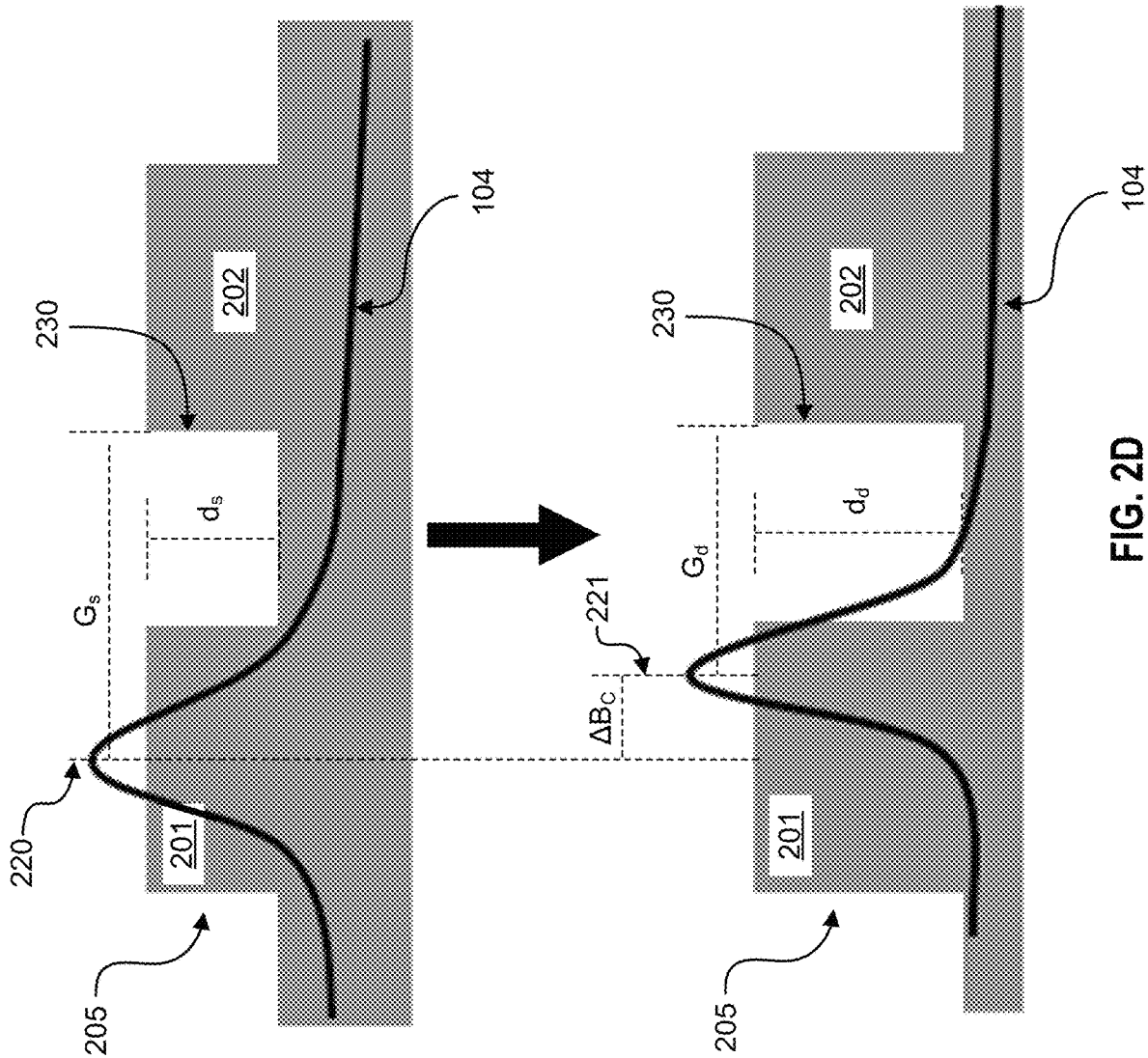
FIG. 2D illustrates an example shift of a guided mode from a first position at a shallow etch depth to a second position at a deep etch depth within the etch-variation tolerant geometry in accordance with embodiments of the technology disclosed herein.

Using the optimization method discussed in greater detail below with respect to FIGS. 3 and 4, the etch-variation tolerant geometry 299A of FIG. 2B can compensate for such differences such that, when the etch depth is at the deep etch depth $d_d$ the transverse profile of the guided mode within the bus waveguide 201 is shifted closer to the ring waveguide 202. This shifting of the transverse mode within the etch-variation tolerant geometry 299A of the bus waveguide 201 is illustrated in FIG. 2D. Where references are common between different figures, it should be interpreted that all descriptions of such references within this disclosure are applicable to all instances of the reference, unless stated otherwise. As depicted in FIG. 2D, as the etch depth moves from the shallow etch depth $d_s$ (the top figure) to the deep etch depth $d_d$ (the bottom figure) the beam center $B_C$ of the guided mode 104 shifts a difference $\Delta B_C$ from a first position 220 to a second position 221. As shown in FIG. 2C, the first position 220 of the beam center BC of the guided mode 104 is a shallow distance $G_s$ from the gap side 230 of the ring waveguide 202, and the second position 221 is a deep distance $G_d$ from the gap side 230. Therefore, if an instance of the directional coupler has an etch depth d 299A equivalent to the deep etch depth $d_d$, the coupling strength can be increased due to the shift in the transverse profile of the guided mode 104, compensating for the increased confinement of the guided mode 104 within the bus waveguide 201.

In various embodiments the etch-variation tolerant geometry 299A can comprise a shape that is asymmetric across a midline ML of the bus waveguide 201. Referring to FIG. 2B, the etch-variation tolerant geometry 299A comprises a first half 210 extending from the midline ML to a first side 206 (e.g., the far side of the bus waveguide 201 from the ring waveguide 202) and a second half 211 extending from the midline ML to a second side 207 (e.g., the near side of the bus waveguide 201 from the ring waveguide 202), each half 210, 211 extending from the first end 203 to the second end 204. In various embodiments, the first half 210 of the etch-variation tolerant geometry 299A has a different shape than the second half 211 across the midline ML. The first half 210 has a more pronounced bump in the center of the etch-variation tolerant geometry 299A (as indicated by the maximum width $W_{max}$ line) compared to the second half 211 at the center of the etch-tolerant geometry 299A. This asymmetry within the example etch-variation tolerant geometry 299A is more clearly shown in FIG. 2C. In FIG. 2C, the second half 211 is shown rotated around the midline ML such that the first side 206 and the second side 207 are both disposed on the same side of the midline ML. With the second half 211 superimposed above the midline ML, it can be seen that the first side 206 has a different shape than the second side 207. Therefore, the etch-variation tolerant geometry 299A is asymmetrically shaped across the midline ML of the bus waveguide 201. In various embodiments, the etch-variation tolerant geometry 299A may be symmetric across the midline ML (not shown in FIGS. 2A-2C). The determination of the symmetry or asymmetry of the etch-variation tolerant geometry 299A is dependent on the range of potential etch depths (defined by the shallow etch depth $d_s$ and the deep etch depth $d_d$) and the target coupling efficiency for the coupling region 212.

Figure 2E:
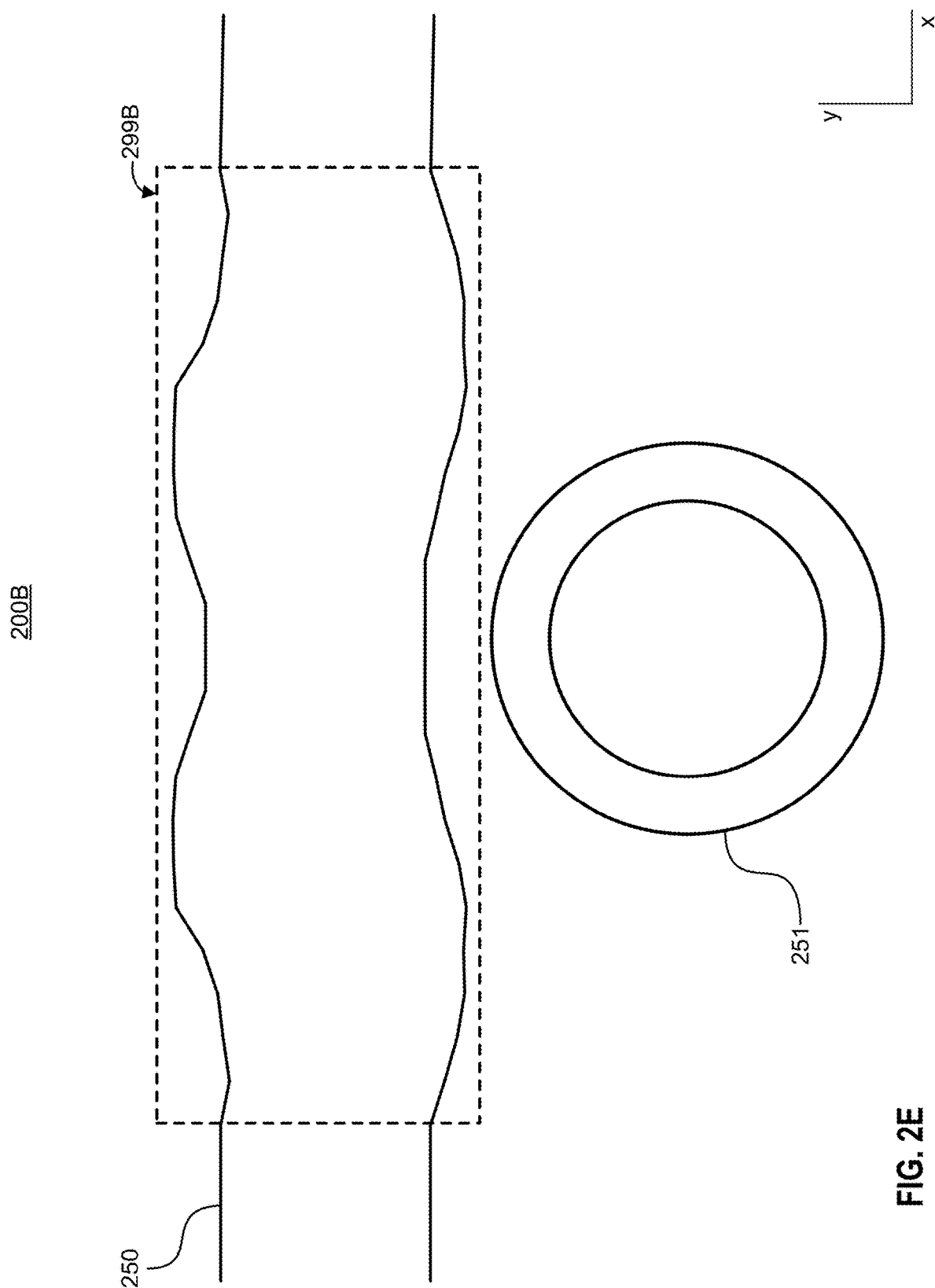
FIG. 2E illustrates another example directional coupler with another example etch-variation tolerant geometry in accordance with embodiments of the technology disclosed herein.
Figure 2F:
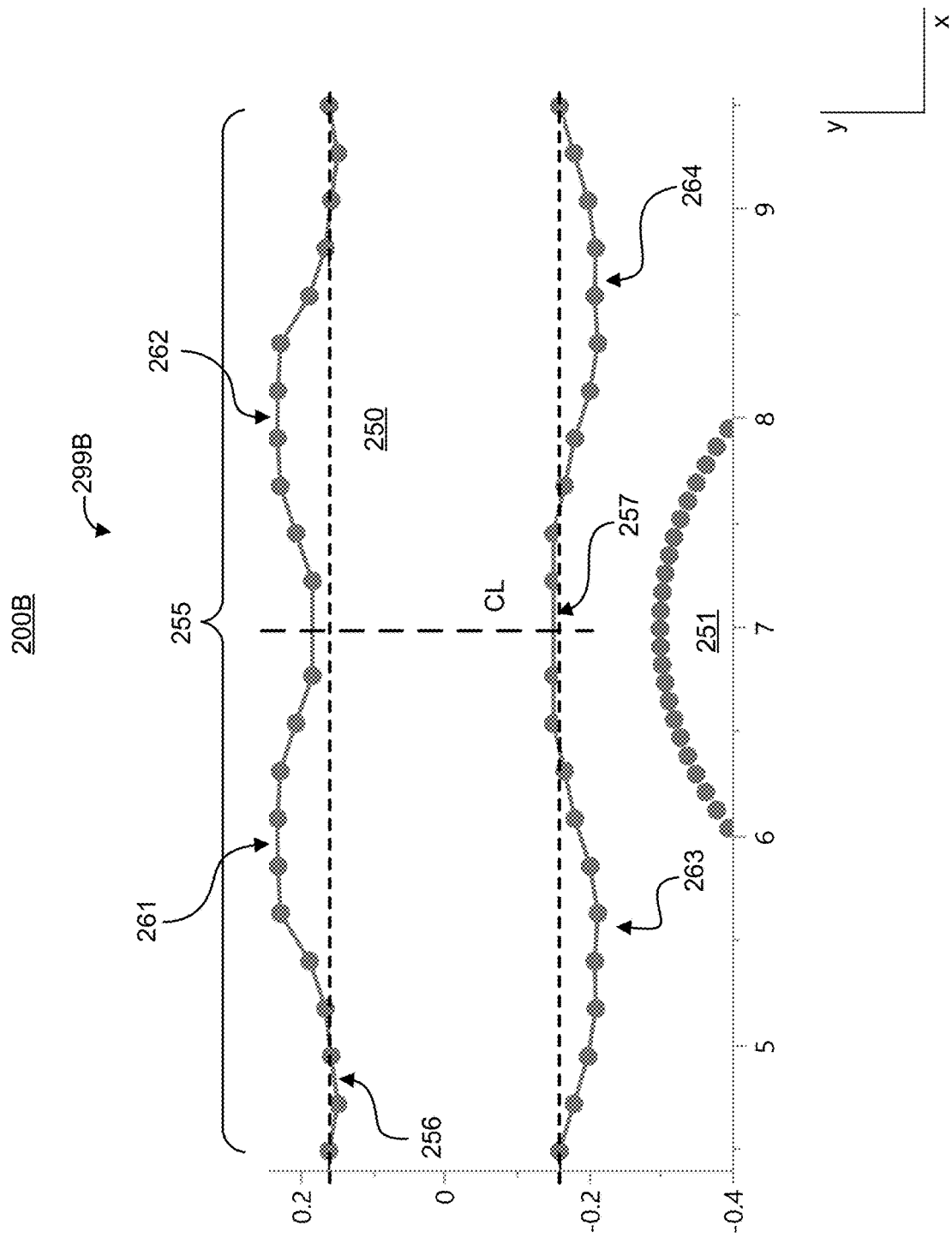
FIG. 2F illustrates the example etch-variation tolerant geometry of FIG. 2E.

As discussed above, the example etch-variation tolerant geometry 299A is an illustrative example of the technology disclosed herein. The optimized etch-variation tolerant geometry can take various shapes to achieve the variation tolerance of the present disclosure. FIGS. 2E and 2F illustrate another directional coupler 200B having an example etch-variation tolerant geometry 299B in accordance with the technology of the present disclosure. The etch-variation tolerant geometry 299B is provided for illustrative purposes and should not be interpreted as limiting the scope of the technology to the depicted embodiment. As shown in FIG. 2E, the directional coupler 200B comprises a bus waveguide 250 and a ring waveguide 251. In various embodiments, the bus waveguide 250 comprises an etch-variation tolerant geometry 299B having a wave-like geometry. As illustrated in FIG. 2F, the first side 256 comprises a shape having two curves 261, 262 extending away from the non-shaped position of the first side of the bus waveguide 201 (as indicated by the broken lines along the x-axis stretching from the portions of the bus waveguide 201 before and after the etch-variation tolerant geometry 299B, each disposed on either side of a centerline CL of etch-variation tolerant geometry 299B. The second side 257 comprises a shape having two curves 263, 264 extending away from the non-shaped position of the second side of the bus waveguide 201 (as indicated by the broken lines along the x-axis stretching from the portions of the bus waveguide 201 before and after the etch-variation tolerant geometry 29(B, each disposed on either side of the centerline CL.

Figure 2G:
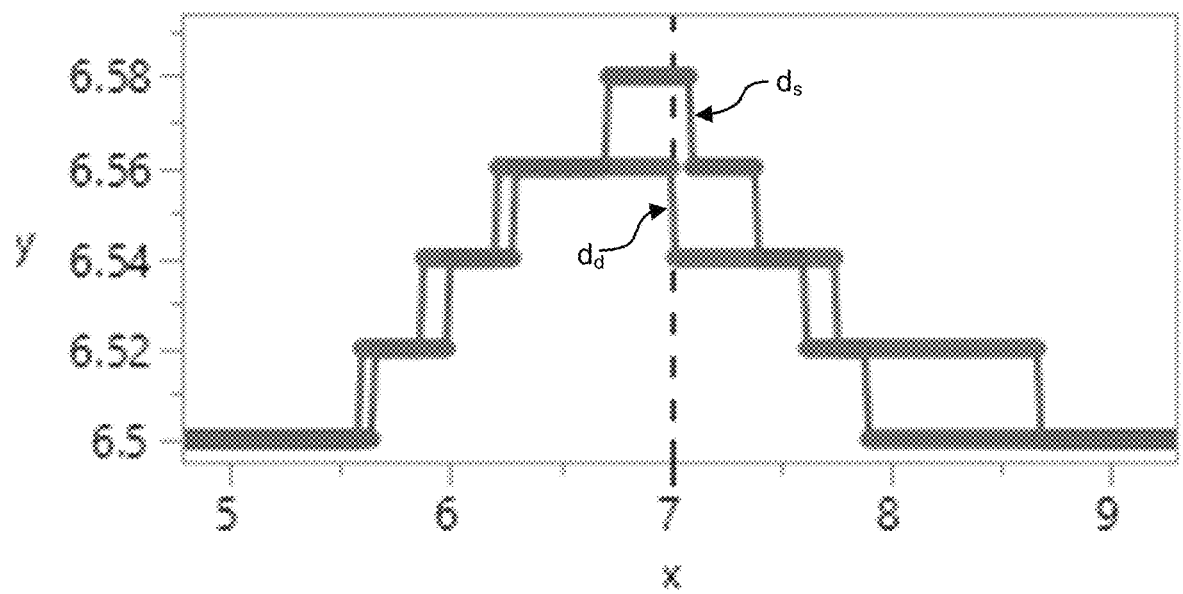
FIG. 2G illustrates the shift of the electric field profile peak of a guided mode within the example etch-variation tolerant geometry of FIGS. 2A-2C at a shallow etch depth and a deep etch depth in accordance with embodiments of the technology disclosed herein.
Figure 2H:
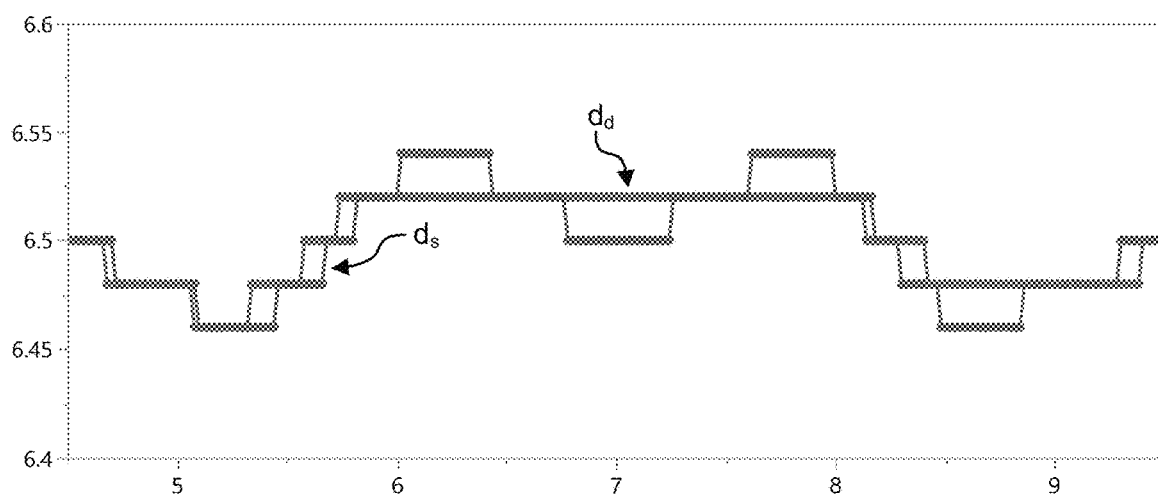
FIG. 2H illustrates the shift of the electric field profile peak of a guided mode within the example etch-variation tolerant geometry of FIGS. 2E and 2F at a shallow etch depth and a deep etch depth in accordance with embodiments of the technology disclosed herein.

Different etch-variation tolerant geometries can have different effects on the coupling strength within the coupling region 212 between different fabrication instances of the same design, and accordingly the coupling ratio. FIGS. 2G and 2H illustrate the effect on the coupling strength of each of the example etch-variation tolerant geometries 299A, 299B, respectively, in accordance with the technology disclosed herein. FIG. 2G is a graph plotting electric field profiles of a directional coupler having the etch-variation tolerant geometry 299A at different depths. The x-axis corresponds to the x-axis of FIG. 2B, indicating a position along the length of the coupling region 212, and the y-axis indicates the position of the peak of the electric field profile within the etch-variation tolerant geometry 299A. For ease of reference, the positions along the positive y-axis correspond to a position further away from the ring waveguide 202. The electric field profile associated with the etch-variation tolerant geometry 299A at the shallow etch depth $d_s$ is shown superimposed on the electric field profile at the deep etch depth $d_d$. of the etch-variation tolerant geometry 299A. As shown in FIG. 2G, at the shallow etch depth $d_s$ the peak of the electric field profile shifts further away from the ring waveguide 202 compared to the profile of the deep etch depth $d_d$. At the deep etch depth $d_d$ the peak of the electric field profile is not as far away from the ring waveguide 202 as at the shallow etch depth $d_s$. This closer electric field profile at the deep etch depth $d_d$ compensates for the weaker coupling strength at the deep etch. In this way, the net coupling ratio within the etch-variation tolerant geometry 299A at either etch depth d is substantially the same. The term "substantially the same" as used in the present disclosure refers to the coupling ratio between the shallow etch depth $d_s$ and the deep etch depth $d_d$ being that is within 0.5% of each other. In some embodiments, the coupling ratio at both etch depths d can be equivalent (i.e., the same). In this way, the directional coupler design (including the etch-variation tolerant geometry 299A) is designed to compensate for potential variations in the etch depth of a coupler instance caused by the fabrication process, the location on the substrate where the coupler is fabricated, or a combination of both. This provides greater confidence that each instance of the directional coupler design provides consistent performance.

The graph of FIG. 2H illustrates how the etch-variation tolerant geometry 299B is capable of achieving variation tolerance over the range between the shallow etch depth $d_s$ and the deep etch depth $d_d$. Similar to FIG. 2G, the graph at FIG. 2H shows the shift of the electric profile of a directional coupler including the etch-variation tolerant geometry 299B at the shallow etch depth $d_s$ superimposed with the shift of the profile at the deep etch depth $d_d$, along the length of the etch-variation tolerant geometry 2006. As shown in FIG. 2H, as light propagates through the waveguide 251 at the deep etch depth $d_d$ the electric field profile is shifted closer to the ring waveguide 252 before being shifter up to a plateau around 5.75 μm. The electric field profile peak remains at the same position through the middle portion of the etch-variation tolerant geometry 299B. At the shallow etch depth $d_s$, the peak electric field profile does not remain in a consistent position through the middle portion of the etch-variation tolerant geometry 299B, instead shifting further away from the ring waveguide 252 compared to the consistent position at the deep etch, closer to the ring waveguide 252 compared to the consistent position at the deep etch, and further away again compared to the consistent position of the deep etch. This wave-like shape compensates for the stronger coupling at the shallow etch depth $d_s$ by both increasing the coupling strength (at the peak closer to the ring waveguide compared to the consistent position at the deep etch depth $d_d$) and decreasing the coupling strength (at the peaks further away from the ring waveguide compared to the consistent position at the deep etch depth $d_d$), resulting in a net coupling ratio across the length of the etch-variation tolerant geometry 299B at the shallow etch depth $d_s$ that is the same or substantially the same as the net coupling ratio at the deep etch depth $d_d$. In this manner, the net coupling strength at the shallow etch depth $d_s$ is substantially the same as the net coupling strength at the deep etch depth $d_d$.

Figure 3A:
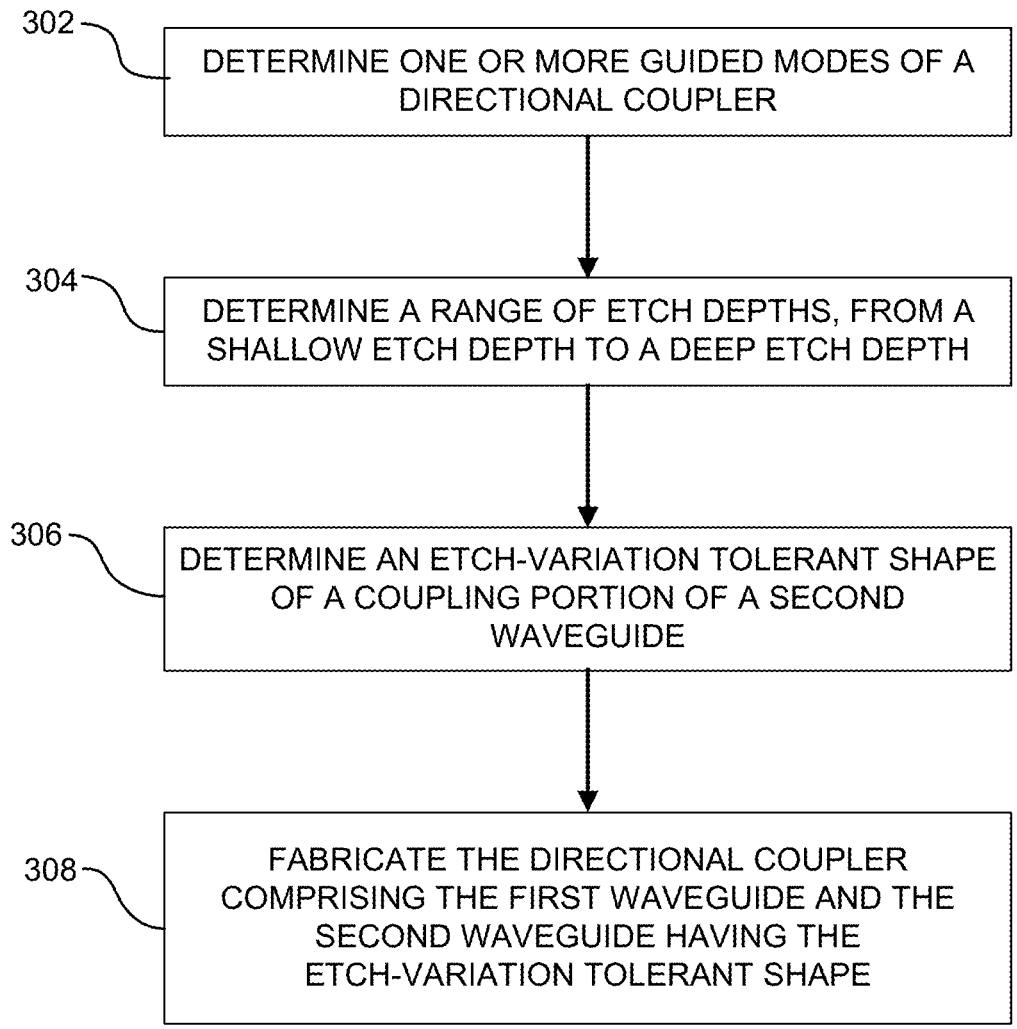
FIG. 3A illustrates an example method in accordance with embodiments of the technology disclosed herein.

The embodiments discussed above with respect to FIGS. 1A-2H are designed to compensate for the different coupling strength between two waveguides at different etch depths that can occur between different fabricated instances of the coupling component design. The etch-variation tolerant geometries in accordance with the technology disclosed herein are optimized to ensure that the coupling efficiency of an optical component (e.g., an optical filter comprising a bus waveguide and a ring waveguide) overall is relatively consistent across the range of etch depths from a shallow etch depth to a deep etch depth. FIG. 3A is an example method 300A in accordance with embodiments of the technology disclosed herein. The example method 300A is provided for illustrative purposes only and should not be interpreted as limiting the scope of the technology to only the depicted method 300A. For ease of discussion, the method 300a shall be discussed with reference to determining one or more etch-variation tolerant geometries for a directional coupler, but the technology is applicable to any optical device or component comprising at least two waveguide structures and should not be limited to only directional couplers. The method 300A can comprise a plurality of machine-readable instructions and sub-instructions stored in a non-transitory machine-readable storage medium accessible by one or more processors, the instructions being executable by the one or more processors.

As shown in FIG. 3A, one or more guided mode of the directional coupler is determined at operation 302. The directional coupler can comprise a first waveguide and a second waveguide. In some embodiments, the directional coupler may comprise a bus waveguide and a ring waveguide, similar to the optical device discussed with respect to FIGS. 2A-2H. In various embodiments, the first and/or second waveguide may comprise a single mode waveguide, wherein only a single guided mode is present within the first and/or second waveguide. In such embodiments, operation 302 comprises determining the single guided mode of the waveguide. In other embodiments, the first and/or second waveguides may configured for multi-mode operation, wherein multiple guided modes propagate within the waveguide. In various embodiments, a plurality of guided modes may be determined where a multi-mode optical signal propagates through the directional coupler. Determining the one or more guided modes of the directional coupler may include determining the transverse mode profile for each of the one or more determined guided modes.

At operation 304, a range of etch depths, from a shallow etch depth to a deep etch depth, is determined. Different fabrication processes can have smaller or larger variations in the range of etch depths that can occur for each instance of the coupler design. Moreover, the location on the surface of the substrate where the instance is being fabricated can also impact the etch depth of the specific instance. In various embodiments, the range of etch depths can be determined based on the fabrication process and/or the fabrication tools to be used in fabricating each instance of the directional coupler. The shallow etch depth can be similar to the shallow etch depth $d_s$ discussed with respect to FIGS. 1A-2H, identifying the shallowest etch depth expected according to the fabrication process and tools utilized. In some embodiments, the design of the waveguide structures for the directional coupler may also be considered in determining the range of etch depths.

Using the range of etch depths determined at operation 304, an etch-variation tolerant shape is determined for a coupling portion of the second waveguide at operation 306. Although the example operation 306 determines the etch-variation tolerant shape for the coupling portion of the second waveguide, in various embodiments operation 306 can determine the the etch-variation tolerant shape of the coupling portion of the first waveguide. In some embodiments, an etch-variation tolerant shape may be determined for the coupling portions of both the first waveguide and the second waveguide at operation 306. In various embodiments, where more than two waveguides are included within an optical device or component, the etch-variation tolerant shape can be determined for any additional waveguide in lieu of or in addition to one or more of the second waveguide, the first waveguide, or both the first and second waveguides.

Figure 3B:
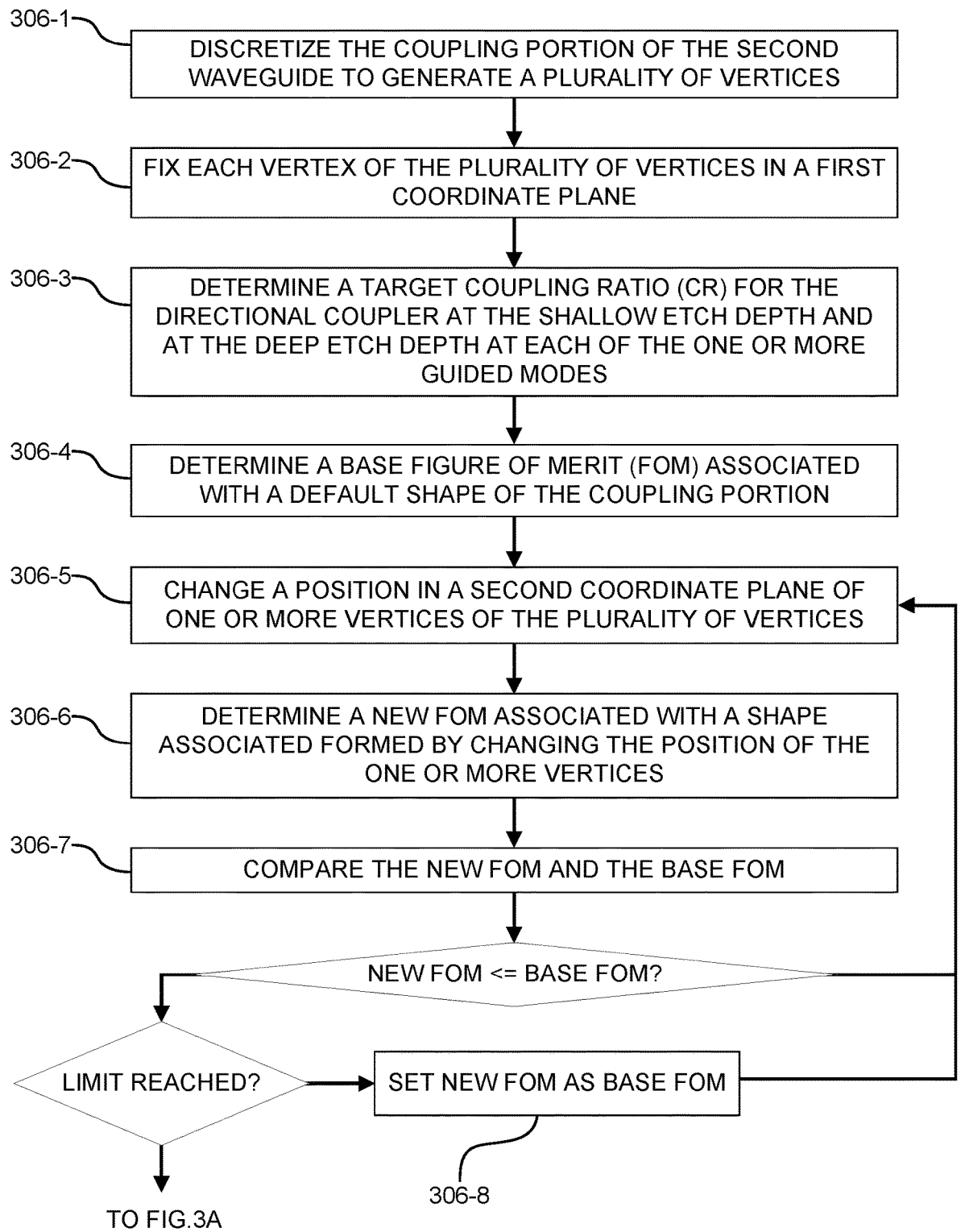
FIG. 3B illustrates another example method in accordance with embodiments of the technology disclosed herein.

Determining the etch-variation tolerant shape/geometry for a coupling portion of one or more waveguides may comprise identifying a target coupling ratio for the directional coupler. FIG. 3B illustrates an example etch-variation tolerant shape/geometry determination method 300B in accordance with the technology of the present disclosure. In various embodiments, the example method 300B can be implemented at operation 306 of the example method 300A of FIG. 3A. The example method 300B is provided for illustrative purposes and should not be interpreted as limiting the scope of the technology to only the depicted etch-variation tolerant shape/geometry determination method. The method 300B can comprise a plurality of machine-readable instructions and sub-instructions stored in a non-transitory machine-readable storage medium accessible by one or more processors, the instructions being executable by the one or more processors.

As shown in FIG. 3B, the coupling portion of the second waveguide is discretized to generate a plurality of vertices at operation 306-1. In various embodiments, the resolution of the discretization can range from a coarse resolution to a fine resolution. As a non-limiting example, a coarse resolution may result in a total of 20 vertices being generated (10 vertices along a first side of the coupling portion of the second waveguide and 10 vertices along a second side of the coupling portion) and a fine resolution may result in a total of 100 vertices being generated (50 vertices along a first side and 50 vertices along the second side). In some embodiments, an intermediate resolution between the coarse resolution and the fine resolution may be used. As a non-limiting example, the intermediate resolution can generate 40 vertices, 20 along a first side and 20 along a second side. In some embodiments, the resolution can be determined based on the length of the coupling portion of the second waveguide such that vertices between different directional coupler designs are proportionally spaced along the length of the respective coupling portion.

Figure 3C:
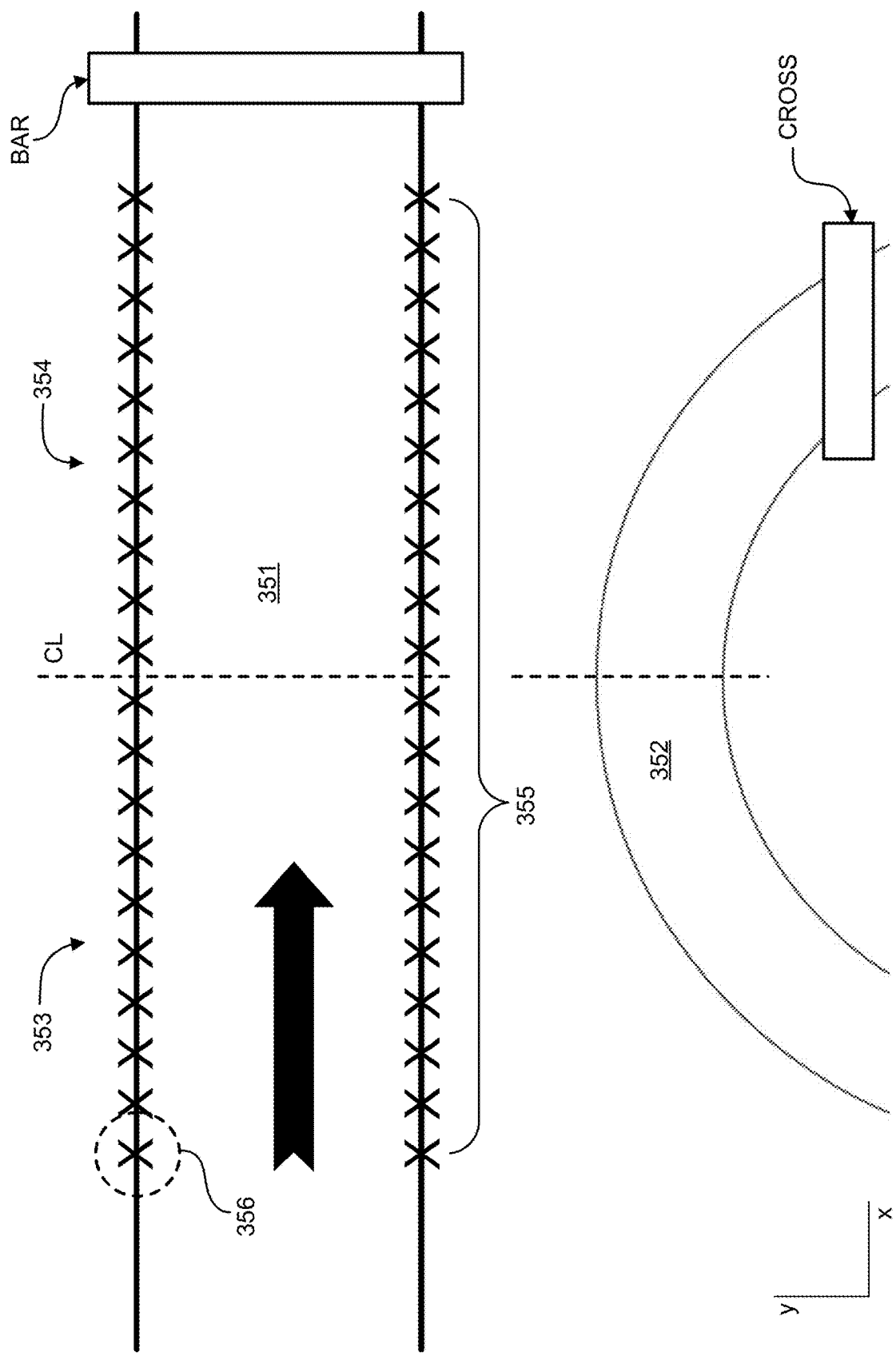
FIG. 3C illustrates an example discretization of a waveguide portion in accordance with embodiments of the technology disclosed herein.

At operation 306-2, each vertex of the plurality of vertices may be fixed in a first coordinate plane. In various embodiments, the shape of the second waveguide may be bound in a coordinate plane. As a non-limiting example, the vertices may be fixed in position along the length of the coupling portion such that the vertex cannot move further or closer to any other vertex. FIG. 3C illustrates the discretization and fixing operations 306-1, 306-2 discussed with respect to FIG. 3B. As shown in FIG. 3C, the second waveguide 351 can have an initial shape, or default shape. By default shape this disclosure refers to the traditional shape of a waveguide, such as but not included to straight, ring, racetrack, among others. In the illustrated embodiment, the initial shape comprises a straight waveguide where each side of the waveguide is parallel to the other along the length of the second waveguide. In the depicted example, the coupling portion 355 of the second waveguide 351 is discretized using the intermediate resolution of 40 vertices 356 along the coupling portion 355. The coupling portion 355 comprises two halves across the centerline CL, a left half 353 and a right half 354, each comprising 20 vertices 356 (10 on each side of the half 353, 354). In various embodiments, each vertex 356 can be fixed in the x-coordinate plane so that each vertex 356 cannot be moved along the x-axis (i.e., along the length of the coupling portion 355). Each vertex 356 can remain free to float in the y-coordinate plane, such that each vertex 356 can be individually moved closer to or further away from the first waveguide 352.

Referring back to FIG. 3B, a target coupling ratio (CR) for the directional coupler can be determined at operation 306-3. Determining the target CR can comprise determining a target CR between the input mode and an output mode of the directional coupler. The directional coupler is configured such that a percentage of the light propagating through one waveguide (e.g. a bus waveguide) is transferred to a second waveguide (e.g., a ring waveguide). In various embodiments, some amount of light may be lost as the signal propagates the waveguides. As a non-limiting example, the power can be measured by a BAR monitor on the bus waveguide 351 and the CROSS monitor on the ring waveguide 352, as shown in FIG. 3C. The coupling ratio can be measured on both waveguides at a position after the coupling portion. In various embodiments, the target coupling ratio may be determined based on a desired performance criteria for the directional coupler, such as but not limited to the spectral range, tuning ability, intended application, among others. In various embodiments, the target coupling ratio may be determined based on the desired extinction ratio between the pass band and the stop band of the directional coupler. The desired extinction ratio can be determined based on the specific coupler design and/or application for the component. As a non-limiting example, with respect to the bus waveguide/ring waveguide discussed above in reference to FIGS. 1A-2H, the target coupling ratio may equal the round trip loss of the ring waveguide. Where more than one guided mode is determined at operation 306-1 a target CR can be determined for each guided mode (i.e., for each pair of input-output mode pairs measured by the BAR monitor and the CROSS monitor).

Referring to FIG. 3B, at operation 306-4, a base figure of merit (FOM) associated with the initial or default shape of the coupling portion of the second waveguide is determined. In various embodiments, an FOM can be defined as the sum of square deviations of the CR at the two etch depths from the target CR, and indicates the net coupling ratio for instances of the directional coupler design at the shallow etch depth to the deep etch depth as $$\text{FOM} = (\text{Bar}_{sd} - CR)^2 + (\text{Cross}_{sd} - (1-CR))^2 + (\text{Bar}_{dd} - CR)^2 + (\text{Cross}_{dd} - (1-CR))^2, \quad (1)$$

where CR comprises the target CR, $\text{Bar}_{sd}$ comprises the coupling ratio (normalized power) of the directional coupler at the shallow etch depth (i.e., the power detected at the BAR monitor divided by the input power of the signal entering the directional coupler), $\text{Bar}_{dd}$ of the directional coupler at the deep etch depth (i.e., the power detected at the BAR monitor divided by the input power of the signal entering the directional coupler), $\text{Cross}_{dd}$ comprises the coupling ratio of the directional coupler at the shallow etch depth (i.e., the power detected at the CROSS monitor divided by the input power of the signal entering the directional coupler), and $\text{Cross}_{dd}$ comprises the coupling ratio of the directional coupler at the deep etch depth (i.e., the power detected at the CROSS monitor divided by the input power of the signal entering the directional coupler). Equation 1 provides a metric indicating the difference in the net coupling effect of the current shape at the shallow etch depth and at the deep etch depth with respect to the target CR. In various embodiments, the amount of light lost from the directional coupler can be detected by a loss monitor (not shown in FIG. 3C) communicatively coupled to the directional coupler. In this way, the associated shape is tolerant to variations in the etch depth of each instance of the directional coupler design that may occur from the fabrication process.

Using the FOM(s) defined by equation 1 above, the method 300B can be used to identify the etch-variation tolerant shape having the smallest deviation between the target coupling ratio at the two etch depths for each guided mode determined at operation 306-1. At operation 306-4 a base FOM is determined based on the default or initial shape of the coupling portion of the second waveguide. In various embodiments, the base FOM can optionally be compared to the target coupling ratio to determine if the coupling ratio at the default shape already meets the target coupling ratio between the two etch depths (shallow and deep) for each of the one or more guided modes. If it is, then the method 300B can simply return to the method 300A with the default shape identified as the etch-variation tolerant shape to be used for fabrication. In various embodiments, where more than one guided mode is determined at operation 306-1, a base FOM can be determined for each of the one or more guided modes at the default shape.

Where the base FOM(s) (i.e., the net coupling ratio(s) of the default-shaped coupling portion of the second waveguide over the range of etch depths) is greater than the target coupling ratio, a change in position can be made at operation 306-5 to one or more of the plurality of vertices. In various embodiments, the change in position may occur in the non-fixed coordinate plane, for example in the y-coordinate plane shown in FIG. 3C. In some embodiments, each vertex may be individually floated, while in other embodiments one or more vertices may be bound such that the position of each is limited by the position of one or more other vertices. At operation 306-6, a new FOM can be determined for each of the one or more guided modes determined at operation 306-1, the new FOM being associated with the shape formed by the vertices at their new positions following operation 306-5. To determine the new FOM, equation 1 is applied to the coupling ratios at the various etch depths of the new shape.

At operation 306-7, the new FOM(s) can be compared to the base FOM(s). If the new FOM is less than or equal to the base FOM, it may indicate that the new shape has a lower coupling ratio variation over the range of etch depths compared to the default shape for the associated one of the guided modes determined at operation 306-1. If the new FOM is greater than the base FOM then the base FOM may be more etch-variation tolerant, method 300B can return to operation 306-5 and a new shape can be created by changing the position of one or more vertices. In various embodiments, if one of the FOMs for multiple determined guided modes is greater than the base FOM, the method 300B can return to operation 306-5 to generate a new shape.

Optimization of the etch-variation tolerant shape is performed by achieving a FOM for the one or more guided modes that is as close to zero (indicating no difference at either etch depth) as possible. If the new FOM is less than or equal to the base FOM then the new shape may be more etch-variation tolerant than the base FOM, a determination can be made as to whether an optimization limit has been reached. In various embodiments, a method 300B may be limited by the number of iterations of operations 306-5 to 306-8. In various embodiments, a counter can be incremented each time operation 306-5 is performed. When the counter reaches the iteration limit, the method 300B can move on to operation 308 of the method 300A of FIG. 3A. In some embodiments, the method 300B may be limited by an improvement limit. If the improvement between iterations is less than a certain value, it may indicate that further improvements may be negligible if more iterations are run. In various embodiments, the FOM associated with the previous iterations can be maintained, and the difference in the improvement between the previous iteration and the current iteration can be determined. If the difference is below the improvement limit for a set number of comparisons the method 300B can determine the current shape to be the etch-variation tolerant shape and revert to the method 300A of method 300A. As a non-limiting example, if the difference is below the improvement limit twice in a row the method 300B can determine the current shape as the etch-variation tolerant shape, and move on to operation 308 of the method 300A. If neither of the limits has been reached, the new FOM(s) can be set as the base FOM(s) at operation 306-8. By setting the base FOM(s) as the new FOM(s), the method 300B can compare the next iteration of new FOM(s) against the previous iteration of new FOM(s).

In various embodiments, the method 300B may be applied on only one half of the coupling portion of the second waveguide. As a non-limiting example, the method 300B may be applied only to the left half 353 shown in FIG. 3C. In some embodiments, the left half 353 and the right half 354 are symmetrical across the centerline CL, the right half 354 being a mirror version of the optimized left half 353. Optimizing only half of the coupling portion can reduce the computational overhead of equation 1.

Referring to FIG. 3A, once the etch-variation tolerant shape/geometry is determined for the coupling portion of the second waveguide, the etch-variation tolerant directional coupler can be fabricated at operation 308. Fabrication can be performed using one of a plurality of different fabrication processes known in the art. In various embodiments, operation 308 can comprise manufacturing a plurality of etch-variation tolerant directional couplers having the etch-variation tolerant geometry on the same substrate, each instance having an etch depth within the range of etch depths (i.e., from the shallow etch depth to the deep etch depth).

Figure 4:
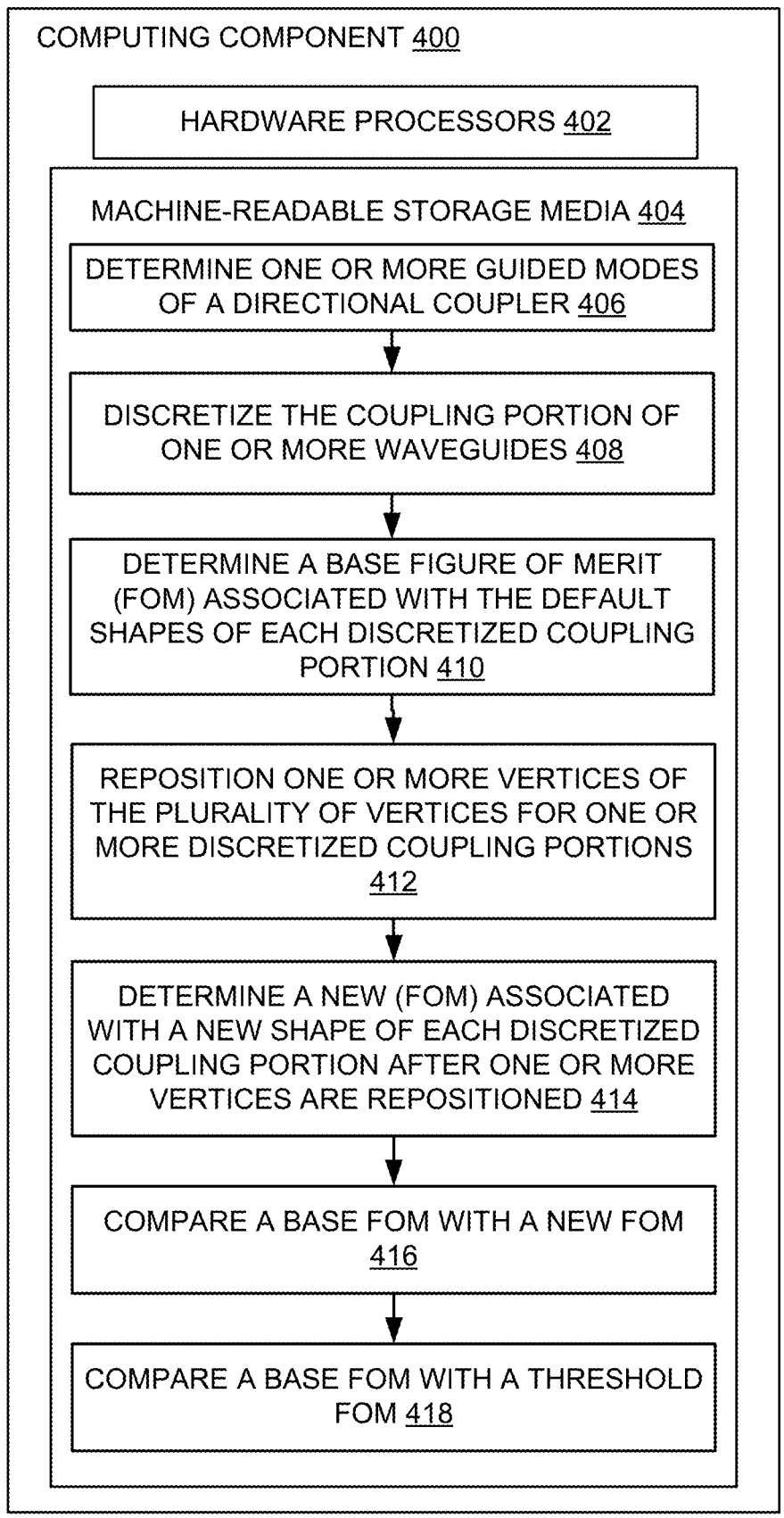
FIG. 4 is an example computing component maintaining non-transitory machine-readable instructions to before one or more methods in accordance with embodiments of the technology disclosed herein.

FIG. 4 is an example computing platform 400 in accordance with embodiments of the present disclosure. Where operations and functionality of computing platform 400 are similar to those discussed with respect to FIGS. 1A-3C, the description should be interpreted to apply. The computing platform 400 includes hardware processors 402

Hardware processors 402 are configured to execute instructions stored on a machine-readable medium 404. Machine readable medium 404 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 404 may include various sub-instructions for performing the function embodied by the identified functions. For example, the instructions "determine one or more guided modes of a directional coupler" 406 may include various sub-instructions for identifying one or more guided modes within a waveguide structure in a manner similar to that discussed above with respect to FIGS. 1A-3C. The instruction "discretize the coupling portion of one or more waveguides" 408 may include various sub-instructions for generating a plurality of vertices along the length of each coupling portion in a manner similar to that discussed with respect to FIGS. 1A-3C above. In various embodiments, the instruction 408 may include sub-instructions for determining a resolution for the discretization.

The instruction "determine a base Figure of Merit (FOM) associated with the default shapes of each discretized coupling portion" 410 may include sub-instructions for taking a sum of the square deviations of the coupling ratio at two etch depths from a target coupling ratio. In various embodiments, the two etch depths can comprise a potential shallow etch depth and deep etch depth based on the fabrication process for the directional coupler, in a similar manner as that discussed above with respect to FIGS. 1A-3C. The instruction "reposition one or more vertices of a plurality of vertices for one or more discretized coupling portions" 412 can comprise instructions for changing the position of the vertices in a manner similar to that discussed above with respect to FIGS. 1A-3C. In various embodiments, the instruction 412 may include sub-instructions to fix each vertex of the plurality of vertices in one coordinate plane such that the position of the vertex within the fixed coordinate plane cannot change. In various embodiments, the instruction 412 may further comprise sub-instructions for repositioning each vertex independently, while in some embodiments the instruction 412 may further comprise sub-instructions for associating one or more vertices together such that the position of each vertex impacts the range of motion of the one or more other vertices.

The instruction "determine a new FOM associated with a new shape of each discretized coupling portion after one or more vertices are repositioned" 414 may comprise include sub-instructions for taking a sum of the square deviations of the coupling ratio at two etch depths from a target coupling ratio. In various embodiments, the two etch depths can comprise a potential shallow etch depth and deep etch depth based on the fabrication process for the directional coupler, in a similar manner as that discussed above with respect to FIGS. 1A-3C and the instruction 410. The instruction "compare a base FOM with a new FOM" 416 can include sub-instructions for determining whether the new FOM is less than or equal to the base FOM in a manner similar to that discussed above with respect to FIGS. 1A-3C. The instruction 416 can further include sub-instructions for repeating instruction 412 if the new FOM is greater than the base FOM. The instruction "compare the new FOM to a threshold FOM" 418 may include sub-instructions for, if the new FOM is determined to be less than or equal to the base FOM at instruction 416, determining if the new FOM is less than or equal to the threshold FOM. Where the new FOM is less than or equal to the threshold FOM, the instruction 418 may further include sub-instructions to identify the associated shape of each discretized coupling portion of the one or more waveguides. Where the new FOM is greater than the threshold FOM, the instruction 418 may include sub-instructions for setting the base FOM as the new FOM and repeating the instruction 412.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
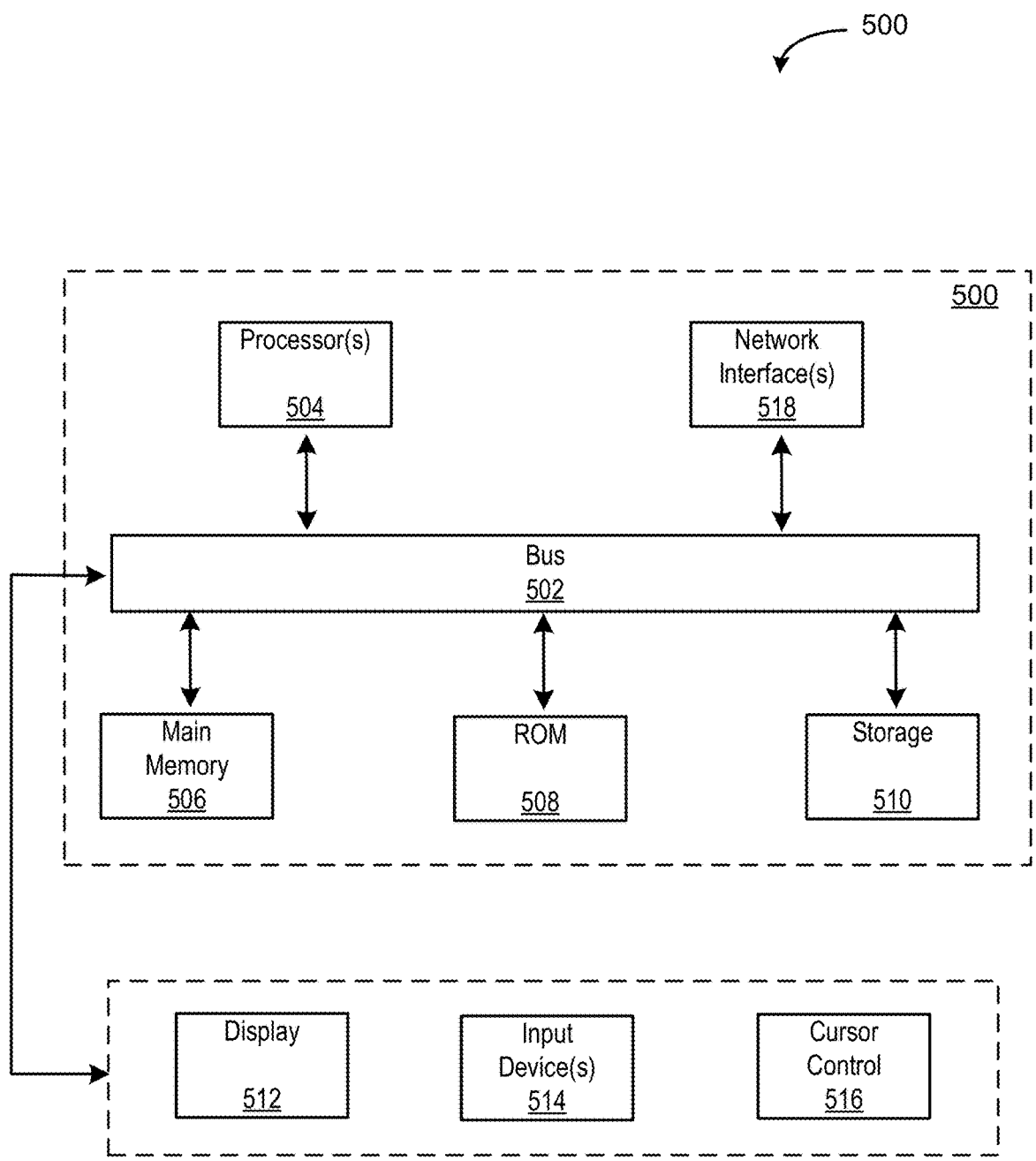
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   estimating a range of etch depths in a coupling region of a directional coupler, the directional coupler comprising a first waveguide having a first waveguide coupling portion coupled to a second waveguide having a second waveguide coupling portion via the coupling region;
   determining, based on the estimated range of etch depths, an etch-variation tolerant geometry of the second coupling portion of the second waveguide by:
   determining a first figure of merit (FOM) associated with a first shape of the second waveguide coupling portion for each of one or more guided modes, the first FOM indicating a first net coupling ratio associated with the first shape over the range of etch depths for each of the one or more guided modes of the directional coupler,
   determining a second shape of the second waveguide coupling portion by changing the first shape of the second waveguide coupling portion, determining a second FOM associated with the second shape of the second waveguide coupling portion for each of the one or more guided modes, the second FOM indicating a second net coupling ratio associated with the second shape over the range of etch depths for each of the one or more guided modes of the directional coupler, and determining an etch-variation tolerant geometry based on a comparison of the first FOM with the second FOM; and fabricating the directional coupler comprising the second waveguide coupling portion comprising the etch-variation tolerant geometry.

2. The method of claim 1,
wherein determining the etch-variation tolerant geometry of the second waveguide coupling region comprises:
discretizing the second waveguide coupling portion to generate a plurality of vertices;
fixing each vertex of the plurality of vertices in a first coordinate plane; and
determining a target coupling ratio for the directional coupler for the one or more guided modes of the directional coupler,
wherein determining the second shape of the second waveguide coupling portion by changing the first shape of the second waveguide coupling portion comprises changing a position in a second coordinate plane of one or more vertices of the plurality of vertices, and
wherein determining the etch-variation tolerant geometry based on the comparison of the first FOM with the second FOM comprises:
comparing the second FOM and the first FOM for each of the one or more modes;
determining whether an optimization limit has been reached if the second FOM for each of the one or more guided modes is less than or equal to the first FOM for each of the one or more guided modes; and
identifying the second shape as the etch-variation tolerant shape if the optimization limit has been reached.

3. The method of claim 2, wherein determining the etch-variation tolerant geometry of the second waveguide coupling region further comprises,
if the second FOM for at least one of the one or more guided modes is greater than the first FOM for the one or more guided modes, determining a third shape of the second waveguide coupling portion by changing a position in the second coordinate plane of one or more other vertices of the plurality of vertices,
determining a third FOM associated with the third shape of the second waveguide coupling portion for each of the one or more guided modes, the third FOM indicating a third net coupling ratio associated with the third shape of the second waveguide coupling portion when over the range of etch depths for each of the one or more guided modes of the directional coupler, and
determining an etch-variation tolerant geometry based on a comparison of the second FOM with the third FOM.

4. The method of claim 2, wherein determining the etch-variation tolerant shape of the second waveguide in the coupling region is performed on a first half of the discretized portion of the second waveguide within the coupling region.

5. The method of claim 1, wherein the etch-variation tolerant geometry reduces a coupling strength between the first waveguide and the second waveguide at a first etch depth and increases a coupling strength between the first waveguide and the second waveguide at a second etch depth.

6. The method of claim 1, wherein the directional coupler comprises a ring resonator, the first waveguide comprising a ring waveguide and the second waveguide comprising a bus waveguide.

7. The method of claim 1, wherein the etch-variation tolerant geometry comprises an asymmetrical shape across a midline of the second waveguide.

8. The method of claim 1, wherein the etch-variation tolerant shape comprises a symmetrical shape across a midplane of the second waveguide.

9. A directional coupler comprising:
a first waveguide, disposed on a substrate, comprising a first waveguide coupling portion;
a second waveguide, disposed on the substrate, comprising a second waveguide coupling portion; and
a coupling region comprising an etch gap disposed between the first waveguide coupling portion and the second waveguide coupling portion,
wherein the second waveguide coupling portion includes an etch-variation tolerant waveguide geometry comprising a plurality of non-uniform widths of the second waveguide coupling portion across a length of the etch-variation tolerant waveguide geometry, the plurality of non-uniform widths configured to tolerate a range of etch gap depths in the coupling region, and wherein the plurality of non-uniform widths comprises are configured to maintain an equivalent coupling ratio at a first etch gap depth and a second etch gap depth by shifting a guided mode of light within the second waveguide coupling portion.

10. The directional coupler of claim 9, wherein the etch-variation tolerant waveguide geometry is configured such that at least one guided mode of a plurality of guided modes at a shallow etch depth of the etch gap is shifted away from the first waveguide coupling portion, and
wherein the etch-variation tolerant waveguide geometry is configured such that the at least one guided mode of the plurality of guided modes at a deep etch depth of the etch gap is shifted towards the first waveguide coupling portion.

11. The directional coupler of claim 9, wherein the etch-variation tolerant waveguide geometry is symmetrical across a midplane of the coupling portion of the second waveguide.

12. The direction coupler of claim 9, wherein the coupling region has a net coupling ratio comprising a sum of coupling ratios along a length of the coupling region.

13. The directional coupler of claim 9, wherein a the etch-variation tolerant waveguide geometry is asymmetrical relative to a centerline of the second waveguide.

14. The directional coupler of claim 9, wherein the first waveguide comprises a ring waveguide and the second waveguide comprises a bus waveguide.

15. The directional coupler of claim 9, wherein the plurality of non-uniform widths includes a first width at a first region and a second width at a second region, and wherein the second waveguide is disposed on the substrate such that the first region of the second waveguide coupling portion is positioned closer towards the coupling portion of the first waveguide than the second region.

16. An etch-variation tolerant directional coupler comprising:
a ring waveguide, disposed on a substrate, comprising a ring coupling portion;
a bus waveguide, disposed on the substrate, comprising a bus coupling portion; and a coupling region comprising an etch gap disposed between the ring coupling portion and the bus coupling portion, wherein the bus coupling portion includes an etch-variation tolerant waveguide geometry comprising a plurality of non-uniform widths of the bus coupling portion across a length of the etch-variation tolerant waveguide geometry, the plurality of non-uniform widths configured to tolerate a range of etch gap depths in the coupling region, and wherein the plurality of non-uniform widths are configured to maintain an equivalent coupling ratio at a first etch gap depth and a second etch gap depth.

17. The etch-variation tolerant directional coupler of claim 16, wherein the etch-variation tolerant geometry is configured such that a guided mode at a shallow etch depth of the etch gap is shifted away from the ring coupling portion, and wherein the etch-variation tolerant geometry is configured such that the guided mode at a deep etch depth of the etch gap is shifted towards the ring coupling portion.

18. The etch-variation tolerant directional coupler of claim 16, wherein a net coupling ratio within the coupling region comprises a sum of coupling ratios across a length of the coupling region.

\* \* \* \* \*